US012663650B2

(12) United States Patent
Wang et al.

(10) Patent No.: US 12,663,650 B2
(45) Date of Patent: Jun. 23, 2026

(54) HEAD-MOUNTABLE DEVICE WITH ADAPTABLE FIT

(71) Applicant: Apple Inc., Cupertino, CA (US)

(72) Inventors: Paul X. Wang, Cupertino, CA (US);
Benjamin A. Shaffer, San Jose, CA
(US); Adam Y. Kollgaard, Santa Clara,
CA (US); Liam R. Martinez,
Sunnyvale, CA (US); Rex T. Ehman,
Santa Cruz, CA (US); **Samuel G.
Smith, San Francisco, CA (US); Timon
A. Wright,** San Francisco, CA (US);
Evan A. Cernokus, Campbell, CA (US)

(73) Assignee: Apple Inc., Cupertino, CA (US)

( * ) Notice: Subject to any disclaimer, the term of this
patent is extended or adjusted under 35
U.S.C. 154(b) by 304 days.

(21) Appl. No.: 18/559,554

(22) PCT Filed: May 10, 2022

(86) PCT No.: PCT/US2022/028629
§ 371 (c)(1),
(2) Date: Nov. 7, 2023

(87) PCT Pub. No.: WO2022/240903
PCT Pub. Date: Nov. 17, 2022

(65) Prior Publication Data
US 2024/0377638 A1 Nov. 14, 2024

Related U.S. Application Data

(60) Provisional application No. 63/186,723, filed on May
10, 2021.

(51) Int. Cl.
*G02B 27/01* (2006.01)
*G06F 1/16* (2006.01)

(52) U.S. Cl.
CPC ..... *G02B 27/0172* (2013.01); *G02B 27/0176*
(2013.01); *G06F 1/163* (2013.01); *G02B
2027/0138* (2013.01)

(58) Field of Classification Search
None
See application file for complete search history.

(56) References Cited

U.S. PATENT DOCUMENTS 2,979,729 A * 4/1961 Hirschmann, Jr. ...... G02C 5/08
2/446
2018/0239151 A1* 8/2018 Chang ................ G02B 27/0176
(Continued)

FOREIGN PATENT DOCUMENTS

WO WO 2016/070248 5/2016

OTHER PUBLICATIONS

International Search Report and Written Opinion from PCT/US2022/
028629, dated Sep. 14, 2022, 10 pages.

*Primary Examiner* — Ryan Crockett
(74) *Attorney, Agent, or Firm* — BAKERHOSTETLER

(57) ABSTRACT

A head-mountable device can include adaptable compo-
nents, which move to comfortably engage the face of the
user and to exclude light from an external environment. A
head-mountable device can include a light seal that includes
discrete portions that bend and/or pivot as needed to con-
form to a face of the user. Such mobility allows the portions
to be oriented with respect to corresponding regions of the
face, so that an engagement surface of each portion directly
engages the corresponding region of the face to maximize
the surface area of contact. Such a configuration can be
provided while also providing an aesthetically pleasing
appearance by providing one or more covers that form
continuous, breathable surfaces with the desired opacity.

20 Claims, 7 Drawing Sheets

(56) References Cited

U.S. PATENT DOCUMENTS

| | | | |
|---|---|---|---|
| 2019/0041899 A1* | 2/2019 | Ellis | G06F 1/163 |
| 2020/0124860 A1* | 4/2020 | Gwak | G02B 27/0176 |
| 2020/0233453 A1* | 7/2020 | Hatfield | G06F 1/1637 |
| 2024/0036324 A1* | 2/2024 | Kasar | G02B 27/0172 |
| 2024/0077940 A1* | 3/2024 | Mendez | G06F 3/041 |

* cited by examiner

HEAD-MOUNTABLE DEVICE WITH ADAPTABLE FIT

CROSS-REFERENCE TO RELATED APPLICATION

This application claims the benefit of U.S. Provisional Application No. 63/186,723, entitled "HEAD-MOUNT-ABLE DEVICE WITH ADAPTABLE FIT," filed May 10, 2021, the entirety of which is incorporated herein by reference.

TECHNICAL FIELD

The present description relates generally to head-mount-able devices, and, more particularly, to light seals of head-mountable devices having adaptable fit capabilities.

BACKGROUND

A head-mountable device can be worn by a user to display visual information within the field of view of the user. The head-mountable device can be used as a virtual reality (VR) system, an augmented reality (AR) system, and/or a mixed reality (MR) system. A user may observe outputs provided by the head-mountable device, such as visual information provided on a display. The display can optionally allow a user to observe an environment outside of the head-mount-able device. Other outputs provided by the head-mountable device can include speaker output and/or haptic feedback. A user may further interact with the head-mountable device by providing inputs for processing by one or more components of the head-mountable device. For example, the user can provide tactile inputs, voice commands, and other inputs while the device is mounted to the user's head.

BRIEF DESCRIPTION OF THE DRAWINGS

Certain features of the subject technology are set forth in the appended claims. However, for purpose of explanation, several embodiments of the subject technology are set forth in the following figures.

DETAILED DESCRIPTION

Figure 1:
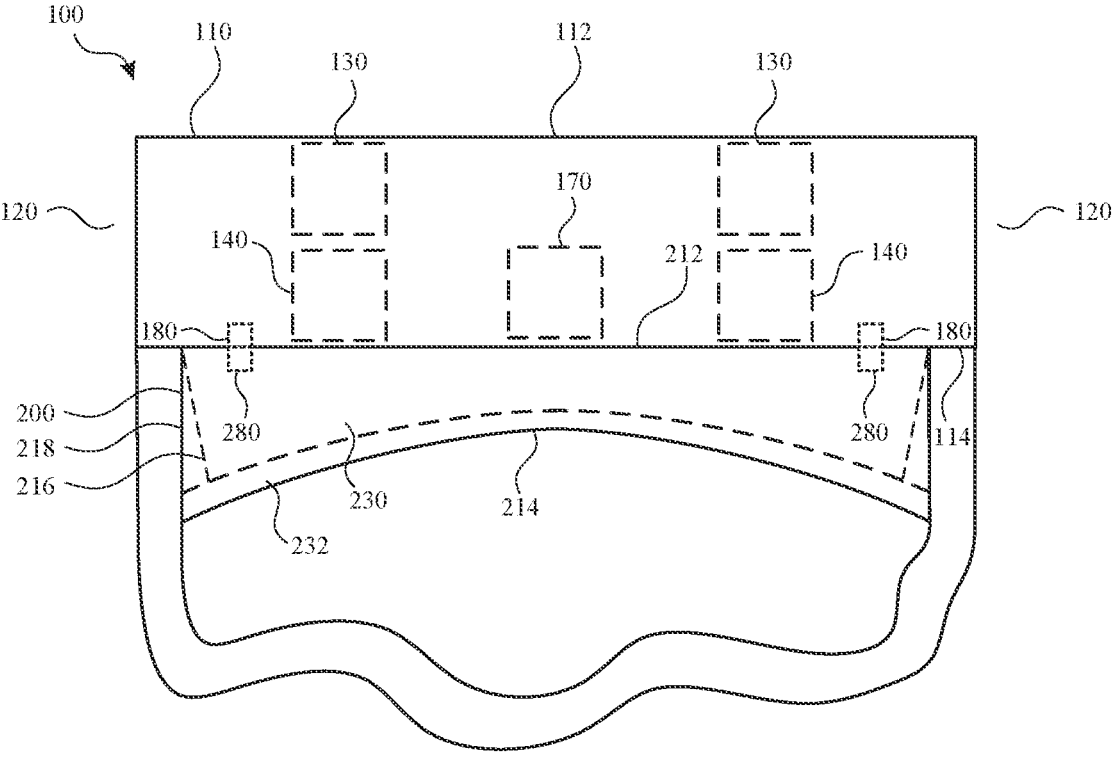
FIG. 1 illustrates a top view of a head-mountable device with a light seal, according to some embodiments of the present disclosure.

The detailed description set forth below is intended as a description of various configurations of the subject technology and is not intended to represent the only configurations in which the subject technology may be practiced. The appended drawings are incorporated herein and constitute a part of the detailed description. The detailed description includes specific details for the purpose of providing a thorough understanding of the subject technology. However, it will be clear and apparent to those skilled in the art that the subject technology is not limited to the specific details set forth herein and may be practiced without these specific details. In some instances, well-known structures and components are shown in block diagram form in order to avoid obscuring the concepts of the subject technology.

Head-mountable devices, such as head-mountable displays, headsets, visors, smartglasses, head-up display, etc., can perform a range of functions that are managed by the components (e.g., sensors, circuitry, and other hardware) included with the wearable device.

Many of the functions performed by a head-mountable device are optimally experienced when the components are in their most preferred position and orientation with respect to a user wearing the head-mountable device. For example, the head-mountable device can include a display that visu-ally outputs display-based information toward the eyes of the user. The position and orientation of the displays relative to the eyes depends, at least in part, on how the head-mountable device is positioned on the face of the user. Due to variations in facial features across different users, a given head-mountable device may require adjustment to accom-modate different users. For example, different users can have different facial features (e.g., face plane slope, forehead size, eye location). Accordingly, different users may perceive the displayed information differently unless a preferred arrange-ment is provided. It can be costly to require each user to acquire an entire head-mountable device that is specifically tailored to their facial features. Accordingly, it can be desirable to provide face engagement features that adapt and conform to a user's face to maximize comfort and light sealing capabilities.

Additionally, it can be desirable to provide face engage-ment features that maintain the components of the head-mountable device (e.g., lenses and/or other optical compo-nents) a safe distance from the eyes (e.g., cornea) of the user. It can also be desirable to maximize the comfort of the user by distributing forces on the face of the user to locations that are less sensitive to such forces.

It can also be desirable to provide for flow of air and/or other ventilation to reduce the impact of heat and/or mois-ture accumulation within regions of the head-mountable device. Such ventilation can be achieved while providing an aesthetically pleasing appearance.

Embodiments of the present disclosure provide a head-mountable device that provides adaptable components, which move to comfortably engage the face of the user and to exclude entry of light from an external environment. A head-mountable device can include a light seal that includes discrete portions that bend and/or pivot as needed to conform to a face of the user. Such mobility allows the portions to be oriented with respect to corresponding regions of the face, so that an engagement surface of each portion directly engages the corresponding region of the face to maximize the surface area of contact. Such a configuration can be provided while also providing an aesthetically pleasing appearance by providing one or more covers that form continuous, breathable surfaces with the desired opacity.

These and other embodiments are discussed below with reference to FIGS. 1-14. However, those skilled in the art will readily appreciate that the detailed description given herein with respect to these Figures is for explanatory purposes only and should not be construed as limiting.

According to some embodiments, for example as shown in FIG. 1, a head-mountable device 100 includes a frame 110 and a light seal 200 that are worn on a head of a user. The frame 110 can be positioned in front of the eyes of a user to provide information within a field of view of the user. The frame 110 and/or the light seal 200 can provide a nosepiece to rest on a user's nose.

The frame 110 can provide structure around a peripheral region thereof to support any internal components of the frame 110 in their assembled position. For example, the frame 110 can enclose and support various internal components (including for example integrated circuit chips, processors, memory devices and other circuitry) to provide computing and functional operations for the head-mountable device 100, as discussed further herein. While several components are shown within the frame 110, it will be understood that some or all of these components can be located anywhere within or on the head-mountable device 100. For example, one or more of these components can be positioned within the light seal 200 and/or a head engager 120 of the head-mountable device 100.

The frame 110 can include and/or support one or more cameras 130. The cameras 130 can be positioned on or near an outer side 112 of the frame 110 to capture images of views external to the head-mountable device 100. As used herein, an outer side of a portion of a head-mountable device is a side that faces away from the user and/or towards an external environment. The captured images can be used for display to the user or stored for any other purpose. Each of the cameras 130 can be movable along the outer side 112. For example, a track or other guide can be provided for facilitating movement of the camera 130 therein.

The head-mountable device 100 can include displays 140 that provide visual output for viewing by a user wearing the head-mountable device 100. One or more displays 140 can be positioned on or near an inner side 114 of the frame 110. As used herein, an inner side 114 of a portion of a head-mountable device is a side that faces toward the user and/or away from the external environment.

A display 140 can transmit light from a physical environment (e.g., as captured by a camera) for viewing by the user. Such a display 140 can include optical properties, such as lenses for vision correction based on incoming light from the physical environment. Additionally or alternatively, a display 140 can provide information as a display within a field of view of the user. Such information can be provided to the exclusion of a view of a physical environment or in addition to (e.g., overlaid with) a physical environment.

A physical environment relates to a physical world that people can sense and/or interact with without necessarily requiring the aid of an electronic device. A computer-generated reality environment relates to a wholly or partially simulated environment that people sense and/or interact with the assistance of an electronic device. Examples of computer-generated reality include mixed reality and virtual reality. Examples of mixed realities can include augmented reality and augmented virtuality. Some examples of electronic devices that enable a person to sense and/or interact with various computer-generated reality environments include head-mountable systems, projection-based systems, heads-up displays (HUDs), vehicle windshields having integrated display capability, windows having integrated display capability, displays formed as lenses designed to be placed on a person's eyes (e.g., similar to contact lenses), headphones/earphones, speaker arrays, input systems (e.g., wearable or handheld controllers with or without haptic feedback), smartphones, tablets, and desktop/laptop computers. A head-mountable device can have an integrated opaque display, have a transparent or translucent display, or be configured to accept an external opaque display (e.g., smartphone).

Each display 140 can be adjusted to align with a corresponding eye of the user. For example, each display 140 can be moved along one or more axes until a center of each display 140 is aligned with a center of the corresponding eye. Accordingly, the distance between the displays 140 can be set based on an interpupillary distance ("IPD") of the user. IPD is defined as the distance between the centers of the pupils of a user's eyes.

As further shown in FIG. 1, the light seal 200 can include a body 230 that provides structural support to one or more other components of the light seal 200. The body 230 can include and/or be connected to an inner side 214, an outer side 212, and one or more flanges 232 that define at least a portion of the inner side 214. The body 230 and/or the flanges 232 can support an outer cover 218 and/or an inner cover 216 that extends at least partially from the outer side 212 to the inner side 214, as described further herein. It will be understood that the outer cover 218 and/or the inner cover 216 can move, flex, and/or stretch to accommodate the adjustment capabilities of the flanges 232 described further herein.

As further shown in FIG. 1, engagers can facilitate coupling of the frame 110 to the light seal 200 in a relative position and orientation that aligns the displays 140 of the frame 110 in a preferred position and orientation for viewing by the user. The frame 110 and the light seal 200 can be coupled to prevent ingress of light from an external environment. For example, frame engagers 180 can releasably engage light seal engagers 280. One or more of various mechanisms can be provided to secure the components to each other. For example, mechanisms such as locks, latches, snaps, screws, clasps, threads, magnets, pins, an interference (e.g., friction) fit, knurl presses, bayoneting, and/or combinations thereof can be included to couple and/or secure the frame 110 and the light seal 200 together. The components can remain secured to each other until an optional release mechanism is actuated. The release mechanism can be provided on an outer surface of the head-mountable device 100 for access by a user.

While the light seal 200 is shown schematically with a particular size and shape, it will be understood that the size and shape of the light seal 200, particularly at the inner side 214 of the light seal 200, can have a size and shape that accommodates the face of a user wearing the head-mountable device 100. For example, the inner side 214 can provide a shape that generally matches the contours of the user's face around the eyes of the user. The inner side 214 can be provided with one or more features that allow the light seal 200 to conform to the face of the user to enhance comfort and block light from entering the light seal 200 at the point of contact with the face. For example, the inner side 214, or portions thereof, can provide a flexible, soft, elastic, and/or compliant structure, as described further herein.

The frame 110 and/or the light seal 200 can be supported on a user's head with a head engager 120. The head engager 120 can wrap or extend along opposing sides of a user's head and/or to a rear of the user's head. The head engager 120 can optionally include earpieces for wrapping around or otherwise engaging or resting on a user's ears. It will be appreciated that other configurations can be applied for securing the head-mountable device 100 to a user's head. For example, one or more bands, straps, belts, caps, hats, or other components can be used in addition to or in place of the illustrated head engager 120 of the head-mountable device 100. The head engager 120 can optionally include a band for extending to and/or about a rear side of the head of the user. The head engager 120 can optionally extend from the frame 110 or another component coupled to the frame 110. For example, the head engager 120 can optionally extend from the light seal 200. The band can be stretchable to comfortably provide tension about the head of the user. The head engager can further include an adjustment component (not shown) for adjusting a tightness and/or fit of the head engager.

Figure 2:
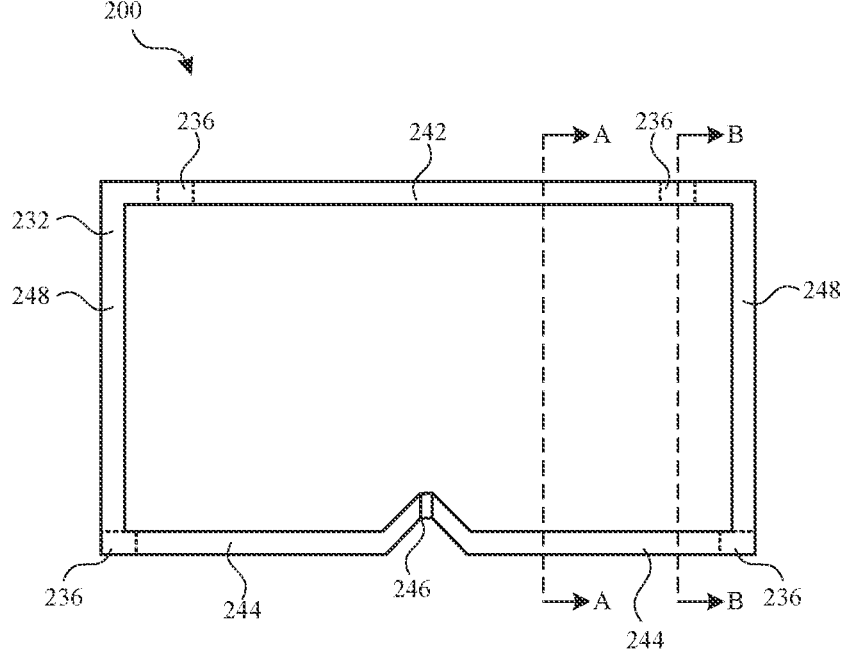
FIG. 2 illustrates a rear view of a light seal, according to some embodiments of the present disclosure.
Figure 3:
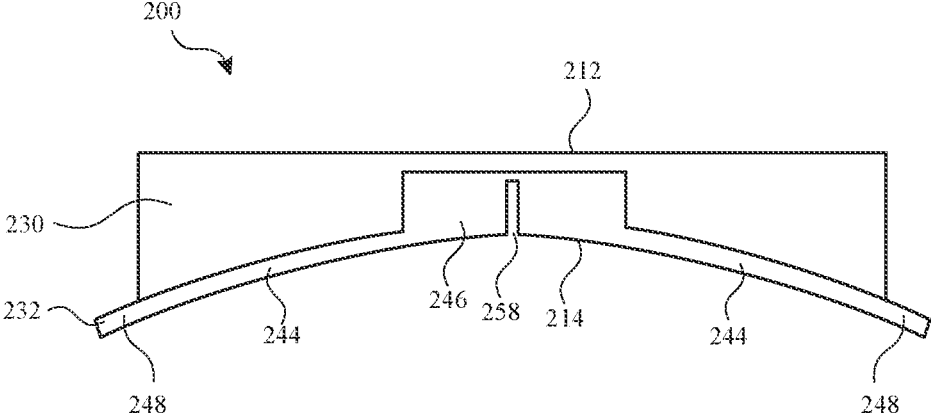
FIG. 3 illustrates a bottom view of a light seal, according to some embodiments of the present disclosure.

Referring now to FIGS. 2 and 3, a light seal can be selected with various portions that match the contours of the face of the user. The light seal 200 can include multiple portions that are moveable (e.g., pivotable) relative to each other and/or a body to provide different configurations for fits that correspond to different users.

For example, as shown in FIG. 2, the light seal 200 can include the flange 232 that is formed by multiple constituent portions. Examples of such portions can include a forehead portion 242 for engaging the forehead of the user, a nose portion 246 for engaging the nose of the user, cheek portions 244 for engaging the cheeks of the user, and side portions 248 for engaging sides of the user's face (e.g., along the temples of the user's head). Any number of other portions can be provided, including sub-components of the portions described herein. The portions of the flange 232 can be continuous or segmented. For example, one or more of the portion(s) can, together, define a continuous surface (e.g., on the inner side 214) for engaging the face of the user. Optionally, bridge connectors 236 can be provided at or between adjacent pairs of portions to provide additional rigidity, as described further herein.

As shown in FIG. 3, the body 230 can be formed separately from the flange 232. For example, the body 230 can extend from and/or include the outer side 212. The body 230 can provide adequate rigidity to structurally support a secure connection to the frame. The flange 232 can extend from and/or include the inner side 214. At least a portion of the flange 232 (e.g., including the inner side 214) can be of a material and/or composition that is softer, more flexible and/or compliant than the material and/or composition of the body 230. As such, the flange 232 may adaptably conform to a face of the user while the body 230 maintains its form. For example, the flange 232 and/or a portion thereof can be overmolded onto the body 230 and/or a portion thereof.

As further shown in FIG. 3, the nose portion 246 of the flange 232 can be configured to engage a nose of a user. For example, while the head-mountable device 10 is worn by a user, with the inner side 214 of the light seal 200 against the face of the user and/or with the head engager against the head of the user, the nose portion 246 can rest on a nose of the user. The nose portion 246 can be formed with a gap 258 that allows opposing sides of the nose portion 246 to flex, bend, and/or pivot away from each other as needed to conform to a nose of the user. As such, the nose portion 246 can provide a force on sides of the nose while the head-mountable device is worn by a user. Such forces can help stabilize the head-mountable device and distribute the weight away from the bridge of the nose.

Figure 4:
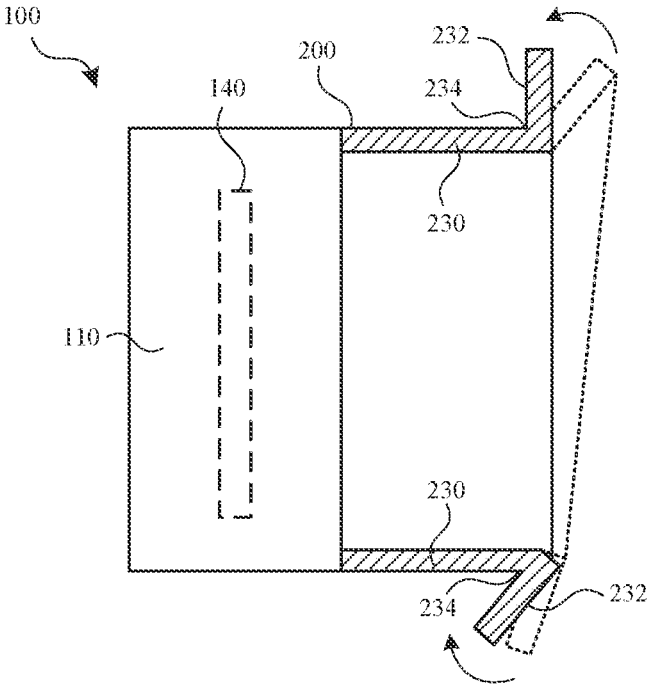
FIG. 4 illustrates a side sectional view of a head-mount-able device taken along line B-B of FIG. 2, according to some embodiments of the present disclosure.
Figure 5:
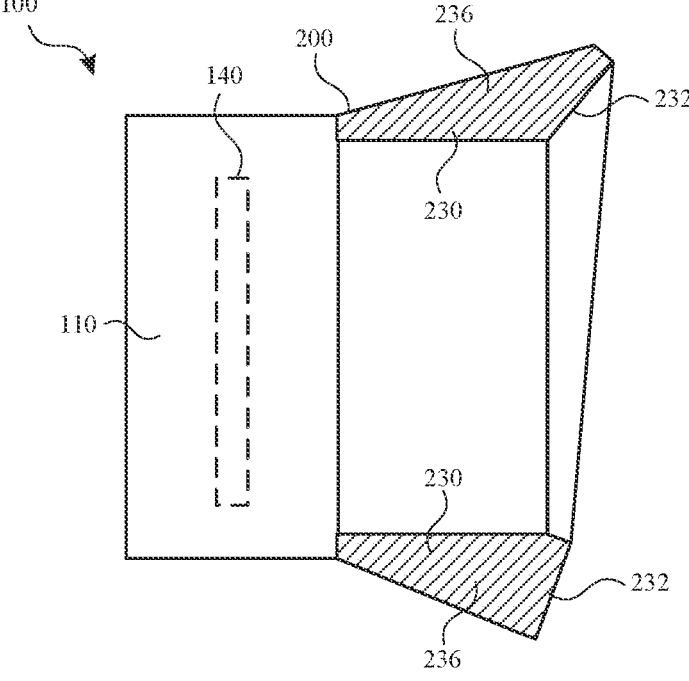
FIG. 5 illustrates a side sectional view of a head-mount-able device, according to some embodiments of the present disclosure.

Referring now to FIGS. 4 and 5, the flange of the light seal at the inner side thereof can provide a range of motion that comfortably and adaptably accommodates a user's face, while also providing adequate rigidity at certain locations.

As shown in FIG. 4, a sectional view taken at a first section of the light seal is shown. The body 230 can provide rigidity to maintain components of the head-mountable device 100, such as the display 140 and/or other optical components (e.g., lenses) a minimum distance away from the eyes of the user when the head-mountable device 100 is worn by the user. For example, the body 230 can be rigid and non-compressible between ends thereof.

At the section shown in FIG. 4, the flange 232 can extend from the body 230 in a manner that allows the flange 232 to move with respect to the body 230. For example, the flange 232 can form one or more face engaging portions, such as the forehead portion, the nose portion, the cheek portions, and/or the side portions. Each of the portions formed by the flange 232 can be pivotably coupled to the body 230, for example, by one or more joints 234 that provide rotational movement of the portions of the flange 232. For example, the joints 234 can be integrally (e.g., monolithically) formed with the body 230 and/or the flange 232 and provide sufficiently flexibility to allow the flange 232 to pivot about the joint 234 with respect to the body 230. For example, the joints 234 can include an elastic structure that facilitates relative movement of the components connected thereby. Additionally or alternatively, the joints 234 can include a ball joint, a pivot joint, a hinge joint, a ball-and-socket joint, a saddle joint, and the like. The joints 234 can maintain the flange 232 in a given position while allowing the portions of the flange 232 to rotate about one or more axes. Each axis of rotation can be defined by the location and configuration of the corresponding joints 234 and selected in a manner that allows the corresponding portion to adapt to a range of facial feature contours of users that may use the light seal.

As further shown in FIG. 4, the portions of the flange 232 can rotate within a correspond range of motion to adapt to the contours of the face of the user. Such motion allows the portions to change its orientation to align an engagement surface thereof with a region of the user's face. For example, a portion (e.g., forehead portion, nose portion, cheek portions, and/or side portions) defined by the flange 232 can rotate about one or more joints 234 to be parallel to a surface of the user's face. By allowing such an adjustment, the surface contact area between the portion of the flange 232 the corresponding region of the user's face is maximized to more broadly distribute forces.

As shown in FIG. 5, a sectional view taken at a second section of the light seal is shown. The body 230 can provide greater rigidity at certain portions to focus a relatively greater amount of forces at certain regions of the user's face. For example, the body 230 can have a thickness at some sections (see FIG. 5) than at other sections (see FIG. 4). Such a difference in thicknesses can provide variable rigidity at different sections of the light seal to facilitate different types of movements and/or ranges of motion for different portions of the flange 232.

In some examples, the variable thickness can be achieved by providing a body 230 with a bridge connector 236 that extends from the inner side to the outer side of the light seal 200. Such a bridge connector 236 can limit movement of the flange 232 with respect to the body 230 by providing a supporting structure. In some examples, the bridge connector 236 can be integrally (e.g., monolithically) formed with the body 230 and/or the flange 232. While the bridge connector 236 of FIG. 5 is shown extending along both the body 230 and the flange 232, it will be understood that the bridge connector 236 can optionally extend to and between ends of the body 230 and/or the flange 232 while maintaining a space there between.

It will be understood that, with the bridge connector 236, the flange 232 is less capable of moving (e.g., pivoting) with respect to the body 230. As such, at sections where the bridge connector 236 is provided, the flange 232 maintains its position and orientation with less adaptation than is provided at sections that form a joint 234 (see FIG. 4). Accordingly, forces applied to the face of the user are focused and maintained along sections that include the bridge connectors 236, whereas forces applied to the face of the user are reduced along sections that include joints 234. Nonetheless, both types of sections can match the contours of the user's face and provide a seal that excludes light from within the light seal 200.

The sections that include the bridge connectors 236 can be selected according to the anatomy of the user. For example, the sections that include the bridge connectors 236 can be those that engage regions of the user's face that are less sensitive and susceptible to fatigue. Examples of such regions include regions that have less muscles and nerves, for example, certain portions of the zygomatic arch, the zygomatic process, the zygomatic bone, and/or the frontal bone. It will be understood that the presence of bones and less muscles in these regions indicates that such regions will move relatively less during use of the head-mountable device. Accordingly, the bridge connectors 236 can maintain the flange 232 in these sections in a more fixed position and/or orientation to maintain secure engagement.

The sections that include the joints 234 can also be selected according to the anatomy of the user. For example, the sections that include the joints 234 can be those that engage regions of the user's face that are more sensitive and susceptible to fatigue. Examples of such regions include the forehead, the cheeks, and the nose. It will be understood that the presence of muscles in these regions indicates that such regions will move relatively more during use of the head-mountable device. Accordingly, the flange 232 in these sections can pivot about the joints 234 to adaptably accommodate such regions of the user's face.

While the bridge connector 236 of FIG. 5 is shown as being a portion of the body 230, it will be understood that the bridge connector 236 can be a separate component that is adjustably moveable with respect to the body 230 and/or the flange 232. Such adjustability can allow a user to modify the location at which forces and distributed. Such adjustments can be performed manually by the user and/or by an actively controlled component (e.g., actuator) of the head-mountable device.

Figure 6:
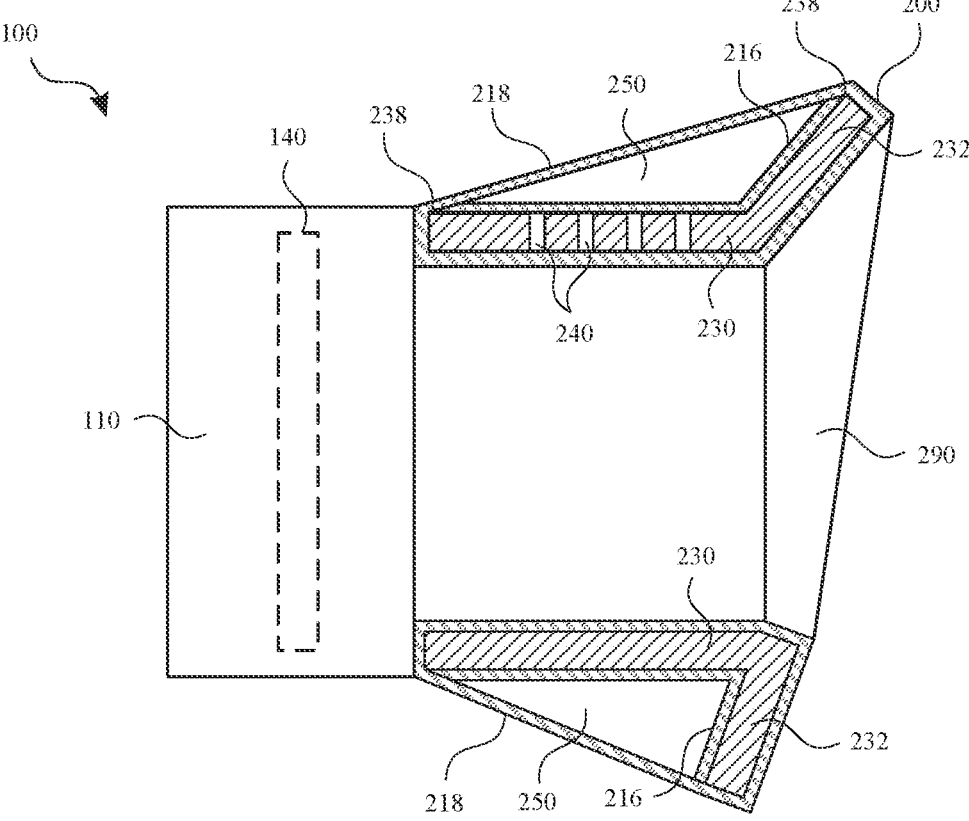
FIG. 6 illustrates a side sectional view of a head-mount-able device taken along line A-A of FIG. 2, according to some embodiments of the present disclosure.

Referring now to FIG. 6, a light seal can provide features for a comfortable fit and pleasing aesthetic appearance. As shown in FIG. 4, the light seal 200 can include the body 230 and the flange 232. The extension of the flange 232 away from a portion of the body 230 at an angle, in at least some sections, can form an outer surface of the body 230 that is generally concave. Such a shape can facilitate movement of the flange 232 to conform to a face of the user, as described herein. Despite the concave shape of the body 230, the light seal 200 can be provided with a more continuous appearance by providing one or more covers along the outer periphery of the light seal 200.

For example, an inner cover 216 can extend along and against the outer surface of the body 230 and/or the flange 232. Such an inner cover 216 can conform to the concave shape of the outer surface, as well as other shapes at other portions of the outer surface. For example, the inner cover 216 can extend along and against the body 230, the flange 232, and one or more bridge connectors (see FIG. 5). Optionally, the inner cover 216 can extend along and against the body 230 without extending along or against the flange 232, or the inner cover 216 can extend along and against the flange 232 without extending along or against the body 230.

To define an outer boundary, an outer cover 218 can extend between protruding edges 238 of the body 230 and/or the flange 232 to form a space 250 enclosed between the inner cover 216 and the outer cover 218. The outer cover 218 can be stretchable to accommodate movement (e.g., pivoting) of the flange 232 relative to the body 230. For example, as the distance between the edges 238 changes, the outer cover 218 can remain in tension to define the outer boundary without sagging. The outer cover 218 can optionally extend about an entirety of the body 230 and/or the flange 232, such that it further extends along inward facing surfaces that define the viewing chamber 290 of the light seal 200. The outer cover 218 can optionally extend along an inner side of the flange 232 to provide a surface for engagement with a face of the user wearing the head-mountable device 100.

The body 230 and/or the flange 232 can provide one or more channels that extend there through for flow of air and/or other ventilation. For example, as shown in FIG. 6, one or more channels can extend between an external environment and the viewing chamber 290 of the light seal 200. The channels can allow air to flow into and/or out of the viewing chamber 290. Accordingly, heat and/or moisture that accumulates within the viewing chamber 290 can be removed from the viewing chamber 290 as fresh air circulates therein. Any number of channels 240 can be provided in one or more of a variety of configurations. For example, some channels 240 can provide intake, and other channels 240 can provide exhaust. The inner cover 216 and the outer cover 218 can be breathable and/or permeable to air to facilitate flow between the viewing chamber 290 and the external environment. For example, the Accordingly, air can travel through the outer cover 218, the space 250, the inner cover 216, and the channel(s) 240. Optionally, flow can be facilitated by a fan or other powered mechanism.

The inner cover 216 and/or the outer cover 218 can be breathable and/or permeable to air. For example, the inner cover 216 and/or the outer cover 218 can each form a mesh that includes portions of material and interstices there between. The mesh can include a structure that is woven, knit, molded, machined, stamped, monolithic, or combinations thereof.

The inner cover 216 and/or the outer cover 218 can provide different levels of opacity. For example, the outer cover 218 can be partially or fully transparent, and inner cover 216 can be fully and/or partially opaque. By further example, the inner cover 216 can be opaquer than the outer cover 218. Accordingly, the outer cover 218 can provide a view there through to the inner cover 216. The inner cover 216 can block a substantial amount of light from passing there through to the viewing chamber 290 while providing airflow for cooling and/or humidity control. The inner cover 216 and/or the outer cover 218 can be selected to have a combination of colors and/or designs (e.g., patterns, markings, and the like) to produce a combined cosmetic appearance.

Referring now to FIGS. 7-10, a light seal can include a variety of features along the body thereof to provide various functions.

Figure 7:
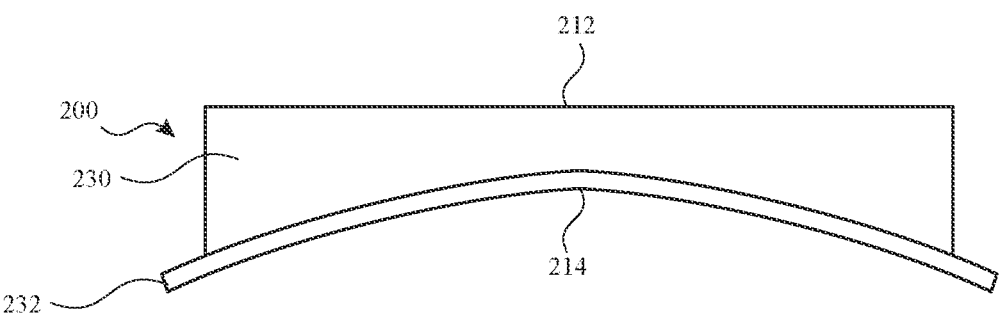
FIG. 7 illustrates a top view of a light seal, according to some embodiments of the present disclosure.

As shown in FIG. 7, a body 230 can extend from and/or include the outer side 212. The body 230 can provide adequate rigidity to structurally support a secure connection to the frame. The flange 232 can extend from and/or include the inner side 214. At least a portion of the flange 232 (e.g., including the inner side 214) can be of a material and/or composition that is softer, more flexible and/or compliant than the material and/or composition of the body 230. As such, the flange 232 may adaptably conform to a face of the user while the body 230 maintains its form.

Figure 8:
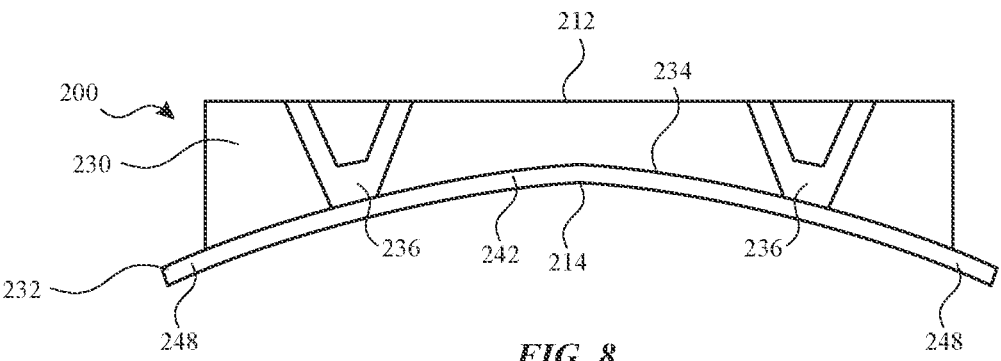
FIG. 8 illustrates a top view of a light seal, according to some embodiments of the present disclosure.

As shown in FIG. 8, the body 230 can be provided with variable thickness and/or reinforcing structures to selectively provide variable flexibility to the flange 232 at different sections of the light seal 200. For example, the body 230 can include and/or be coupled to one or more bridge connectors 236 that extends from the outer side 212 to the inner side 214 of the light seal. 200 to limit movement of the flange 232 at certain sections. The bridge connector 236 can optionally provide some ability to flex, bend, and/or foreshorten with the application of compressive forces. At sections where the bridge connector 236 is provided, the flange 232 maintains its position and orientation with less adaptation than is provided at sections that form a joint 234. For example, bridge connectors 236 can be provided between a forehead portion 242 and one or more side portions 248 of the flange 232 to provide additional rigidity for engagement at the frontal bone of the user. Likewise, bridge connectors 236 can be provided between side portions 248 and cheek portions (not shown) to provide additional rigidity for engagement at the zygomatic arch, the zygomatic process, and/or the zygomatic bone of the user.

Figure 9:
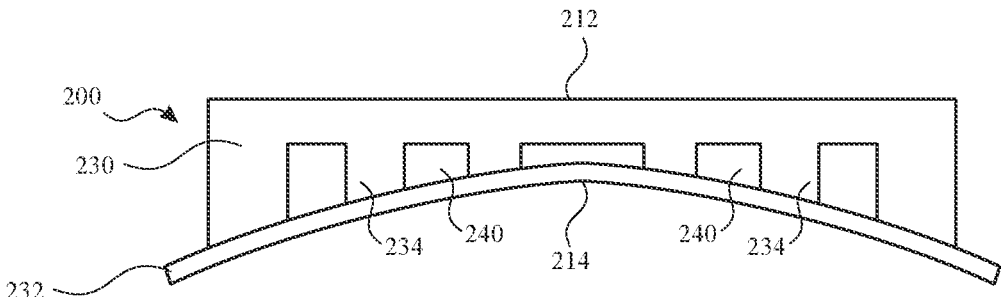
FIG. 9 illustrates a top view of a light seal, according to some embodiments of the present disclosure.

As shown in FIG. 9, the body 230 can be provided with channels 240 that extend between different joints 234 that each extend from the outer side 212 to the inner side 214 of the light seal 200. The joints 234 can provide a degree of flexibility to allow the flange 232 to move (e.g., pivot) relative to the body 230 of the light seal 200. The channels 240 and/or the joints 234 can be of any size to allow flow there through and/or facilitate movement of the flange 232.

Figure 10:
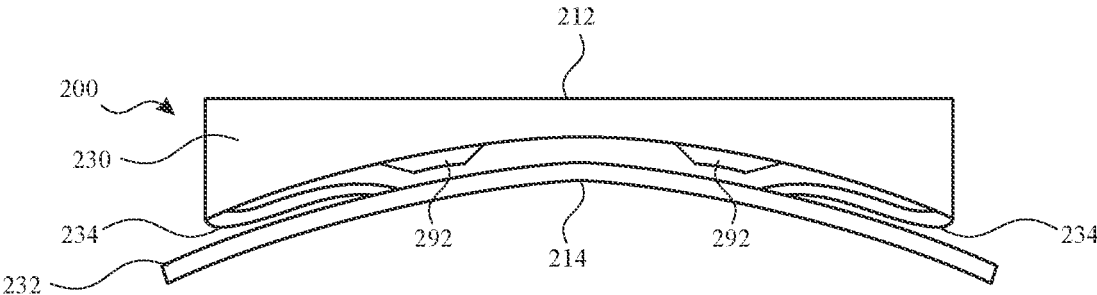
FIG. 10 illustrates a top view of a light seal, according to some embodiments of the present disclosure.

As shown in FIG. 10, the flange 232 and the body 230 can be connected by one or more flexible joints 234. The flexible joints 234 can extend laterally between connections to each of the body 230 and the flange 232 to allow a length thereof to bend and flex. Such action allows the flange 232 to move relative to the body 230 as it conforms to the face of the user. Optionally, the movement of the flange 232 can be limited by one or more stoppers 292 of the body 230. For example, the stoppers 292 can interact with the flange 232 and/or the flexible joints 234 to stop further movement thereof beyond a certain point. It will be understood that the stoppers 292 can be located on the flange 232 to interact with the body 230. The stoppers 292 can be provided a locations where limited movement is desired. For example, stoppers 292 can be provided across from and/or at sections between portions of the flange 232 to provide additional rigidity for engagement at target regions of the user's face, as described herein.

Figure 11:
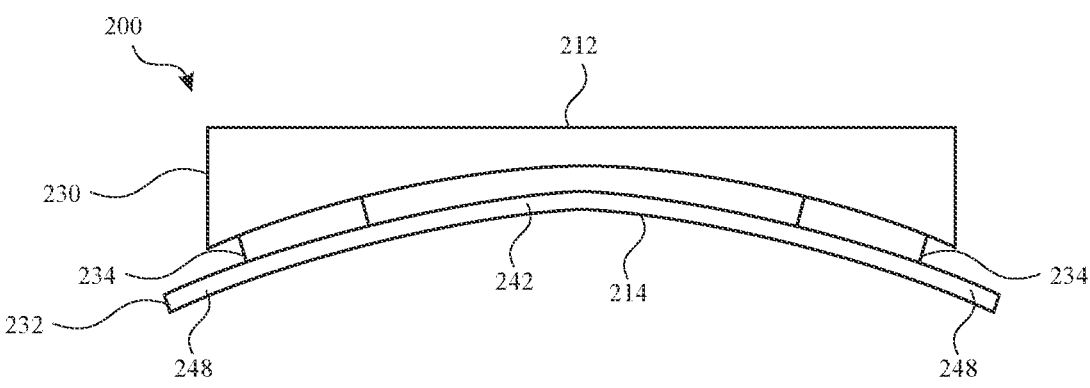
FIG. 11 illustrates a top view of a light seal, according to some embodiments of the present disclosure.
Figure 12:
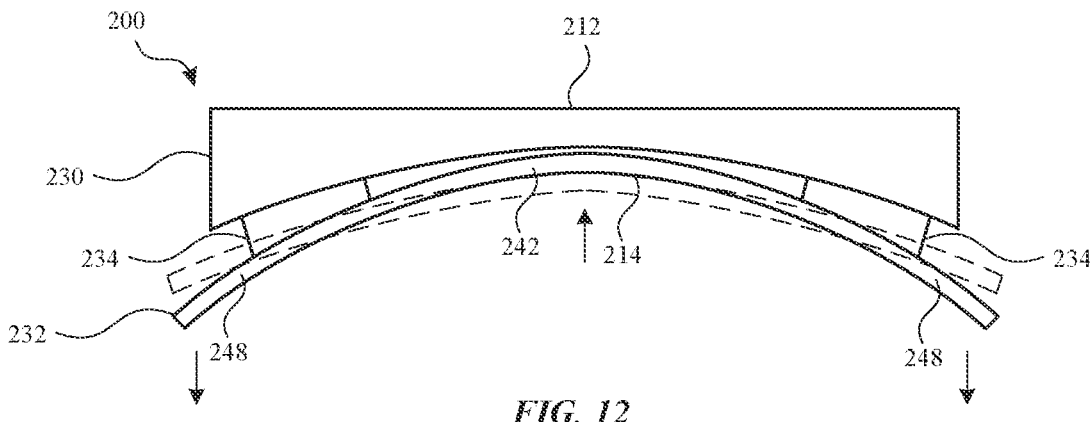
FIG. 12 illustrates a top view of the light seal of FIG. 11 in a first adjusted configuration, according to some embodiments of the present disclosure.
Figure 13:
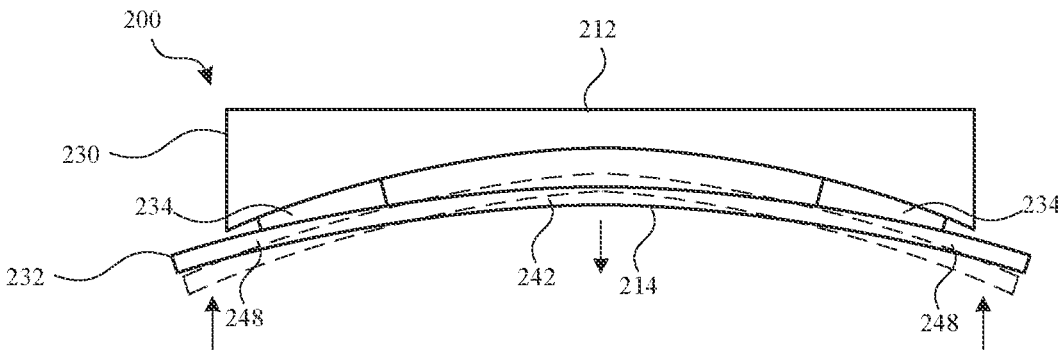
FIG. 13 illustrates a top view of the light seal of FIG. 11 in a second adjusted configuration, according to some embodiments of the present disclosure.

Referring now to FIGS. 11-13, a light seal can alter its curvature to conform to a face of a user.

As shown in FIG. 11, the flange 232 can be coupled to the body 230 by one or more joints 234 disposed there between. At other locations along the body 230 and the flange 232, spaces can be formed to provide the flange 232 with a range of motion. The joints 234 can be integrally (e.g., monolithically) formed with the body 230 and/or the flange 232 and provide sufficiently flexibility to allow the flange 232 to pivot about the joint 234 with respect to the body 230. For example, the joints 234 can include an elastic structure that facilitates relative movement of the components connected thereby. Additionally or alternatively, the joints 234 can include a ball joint, a pivot joint, a hinge joint, a ball-and-socket joint, a saddle joint, and the like.

A head engager can gently pull the light seal 200 against the face of the user to urge the portions of the flange 232 to align with the facial regions of the user. As the light seal 200 is pulled toward and against the face of the user, the corresponding portions of the flange 232 can rotate as they engage the facial features until each of the engagement surfaces is aligned (e.g., parallel with and abutting) the corresponding facial region. As such, the forces against the face can be distributed widely across the engagement surfaces of the portions to enhance comfort of the user.

For example, as shown in FIGS. 12 and 13, each of the side portions 248 can pivot about one or more joints 234 to adjust an orientation thereof relative to the forehead portion 242. In FIG. 12, the forehead portion 242 moves toward the body 230, and the side portions 248 move away from the body 230. In FIG. 13, the side portions 248 move toward the body 230, and the forehead portion 242 moves away from the body 230.

By changing the orientation, the forehead portion 242 can be adjusted to be parallel to (e.g., conforming with) a forehead of the user, and the side portions 248 can be adjusted to be parallel to (e.g., conforming with) the sides of the user's head. By allowing such an adjustment, the surface contact area between the flange 232 and the face of the user is maximized. Additionally, a seal with the face of the user is created and maintained to exclude light from an external environment.

As the flange 232 adapts to the user's face, the curvature thereof is adjusted to match that curvature of the face of the user. While changes in curvature about one axis are illustrated in FIGS. 11-13, it will be understood that the curvatures along the entirety of the flange 232 can be adjusted as needed to match the user's face.

In some embodiments, the portions can rotate freely within a range of motion. Additionally or alternatively, one or more of the portions can be biased to a particular orientation while allowing rotation to other orientations. For example, the joints 234 or another biasing component (e.g., spring, resilient member, etc.) can bias the corresponding portion to a particular orientation. Such an orientation can be one that engages the face of the user.

The joints 234 can be positioned at locations where forces are to be focused, rather than distributed elsewhere. Because the portions of the flange 232 adjacent to the joints does not deflect therefrom, such portions may apply relatively greater amounts of forces on the face of the user compared to portions of the flange 232 that readily deflect. As such, the joints 234 can be provided between the forehead portion 242 and one or more side portions 248 of the flange 232 to provide additional rigidity for engagement at the frontal bone of the user. Likewise, joints 234 can be provided between side portions 248 and cheek portions (not shown) to provide additional rigidity for engagement at the zygomatic arch, the zygomatic process, and/or the zygomatic bone of the user.

The adjustments and configurations described herein can be utilized to offer different configurations for different users. For example, the light seal can be adjustable to accommodate features of different users, thereby providing a preferred and customizable fit. Accordingly, the same head-mountable device can be used by various users in the corresponding configuration for each user.

Figure 14:
FIG. 14 illustrates a block diagram of a head-mountable device, in accordance with some embodiments of the present disclosure.
Figure 14:
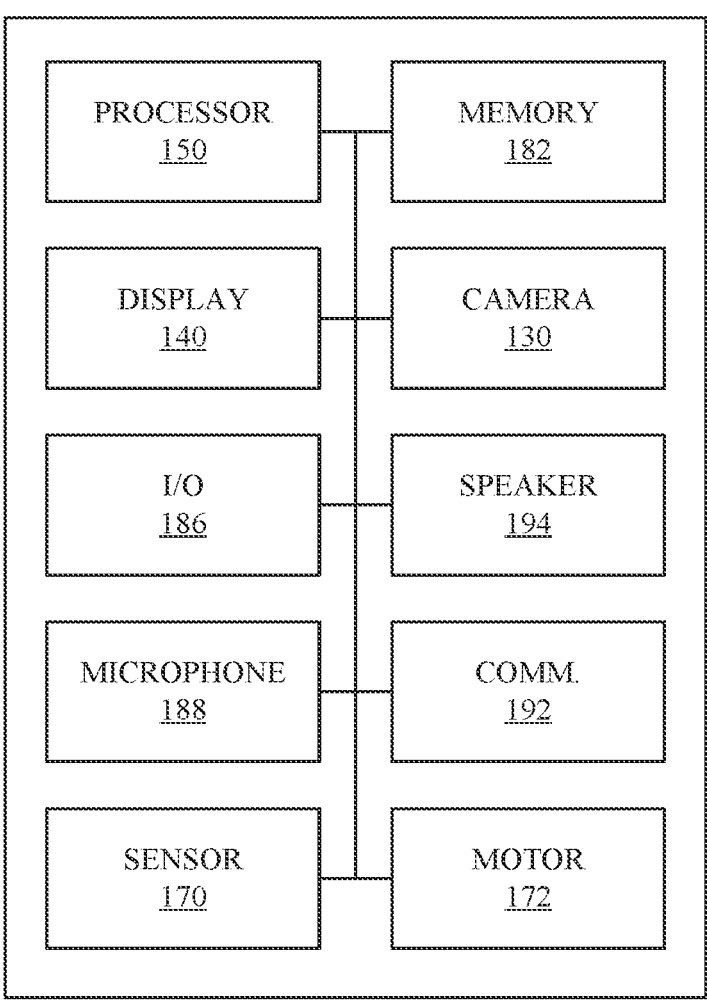

Referring now to FIG. 14, components of the head-mountable device can be operably connected to provide the performance described herein. FIG. 14 shows a simplified block diagram of an illustrative head-mountable device 100 in accordance with one embodiment of the invention. It will be appreciated that components described herein can be provided on one, some, or all of an HMD assembly, a light seal, and/or a head engager. It will be understood that additional components, different components, or fewer components than those illustrated may be utilized within the scope of the subject disclosure.

As shown in FIG. 14, the head-mountable device 100 can include a processor 150 (e.g., control circuitry) with one or more processing units that include or are configured to access a memory 182 having instructions stored thereon. The instructions or computer programs may be configured to perform one or more of the operations or functions described with respect to the head-mountable device 100. The processor 150 can be implemented as any electronic device capable of processing, receiving, or transmitting data or instructions. For example, the processor 150 may include one or more of: a microprocessor, a central processing unit (CPU), an application-specific integrated circuit (ASIC), a digital signal processor (DSP), or combinations of such devices. As described herein, the term "processor" is meant to encompass a single processor or processing unit, multiple processors, multiple processing units, or other suitably configured computing element or elements.

The memory 182 can store electronic data that can be used by the head-mountable device 100. For example, the memory 182 can store electrical data or content such as, for example, audio and video files, documents and applications, device settings and user preferences, timing and control signals or data for the various modules, data structures or databases, and so on. The memory 182 can be configured as any type of memory. By way of example only, the memory 182 can be implemented as random access memory, read-only memory, Flash memory, removable memory, or other types of storage elements, or combinations of such devices.

The head-mountable device 100 can further include a display 140 for displaying visual information for a user. The display 140 can provide visual (e.g., image or video) output. The display 140 can be or include an opaque, transparent, and/or translucent display. The display 140 may have a transparent or translucent medium through which light representative of images is directed to a user's eyes. The display 140 may utilize digital light projection, OLEDs, LEDs, uLEDs, liquid crystal on silicon, laser scanning light source, or any combination of these technologies. The medium may be an optical waveguide, a hologram medium, an optical combiner, an optical reflector, or any combination thereof. In one embodiment, the transparent or translucent display may be configured to become opaque selectively. Projection-based systems may employ retinal projection technology that projects graphical images onto a person's retina. Projection systems also may be configured to project virtual objects into the physical environment, for example, as a hologram or on a physical surface. The head-mountable device 100 can include an optical subassembly configured to help optically adjust and correctly project the image-based content being displayed by the display 140 for close up viewing. The optical subassembly can include one or more lenses, mirrors, or other optical devices.

The head-mountable device 100 can include one or more sensors 170, as described herein. The head-mountable device 100 can include one or more other sensors. Such sensors can be configured to sense substantially any type of characteristic such as, but not limited to, images, pressure, light, touch, force, temperature, position, motion, and so on. For example, the sensor can be a photodetector, a temperature sensor, a light or optical sensor, an atmospheric pressure sensor, a humidity sensor, a magnet, a gyroscope, an accelerometer, a chemical sensor, an ozone sensor, a particulate count sensor, and so on. By further example, the sensor can be a bio-sensor for tracking biometric characteristics, such as health and activity metrics. Other user sensors can perform facial feature detection, facial movement detection, facial recognition, eye tracking, user mood detection, user emotion detection, voice detection, etc. Sensors can include a camera which can capture image based content of the outside world.

The head-mountable device 100 can include an input/output component 186, which can include any suitable component for connecting head-mountable device 100 to other devices. Suitable components can include, for example, audio/video jacks, data connectors, or any additional or alternative input/output components. The input/output component 186 can include buttons, keys, or another feature that can act as a keyboard for operation by the user.

The head-mountable device 100 can include the microphone 188 as described herein. The microphone 188 can be operably connected to the processor 150 for detection of sound levels and communication of detections for further processing, as described further herein.

The head-mountable device 100 can include one or more speakers 194. The speakers 194 can be operably connected to the processor 150 for control of audio output, including sound levels, as described further herein.

The head-mountable device 100 can include communications circuitry 192 for communicating with one or more servers or other devices using any suitable communications protocol. For example, communications circuitry 192 can support Wi-Fi (e.g., a 802.11 protocol), Ethernet, Bluetooth, high frequency systems (e.g., 900 MHz, 2.4 GHz, and 5.6 GHz communication systems), infrared, TCP/IP (e.g., any of the protocols used in each of the TCP/IP layers), HTTP, BitTorrent, FTP, RTP, RTSP, SSH, any other communications protocol, or any combination thereof. Communications circuitry 192 can also include an antenna for transmitting and receiving electromagnetic signals.

The head-mountable device 100 can include a battery, which can charge and/or power components of the head-mountable device 100. The battery can also charge and/or power components connected to the head-mountable device 100.

The head-mountable device 100 can include adjustment control components described herein, such as a motor 172, an actuator, and the like for moving components to a desired relative position and/or orientation.

Accordingly, embodiments of the present disclosure provide a head-mountable device that provides adaptable components, which move to comfortably engage the face of the user and to exclude entry of light from an external environment. A head-mountable device can include a light seal that includes discrete portions that bend and/or pivot as needed to conform to a face of the user. Such mobility allows the portions to be oriented with respect to corresponding regions of the face, so that an engagement surface of each portion directly engages the corresponding region of the face to maximize the surface area of contact. Such a configuration can be provided while also providing an aesthetically pleasing appearance by providing one or more covers that form continuous, breathable surfaces with the desired opacity.

Various examples of aspects of the disclosure are described below as clauses for convenience. These are provided as examples, and do not limit the subject technology.

Clause A: a head-mountable device comprising: a frame; a display supported by the frame; and a light seal coupled to the frame and comprising: a body configured to releasably engage the frame, the body forming a concave shape on an outer surface of the body; an inner cover extending against the outer surface of the body; and an outer cover extending between protruding edges of the body to form a space enclosed between the inner cover and the outer cover.

Clause B: a head-mountable device comprising: a frame; a display supported by the frame; a head engager; and a light seal coupled to the frame and comprising: a body having, in a first section, a first thickness and, in a second section, a second thickness greater than the first thickness; and a flange extending from the body, a portion of the flange being configured to pivot at the first section of the body when the head engager pulls the light seal against a face of a user.

Clause C: a head-mountable device comprising: a frame; a display supported by the frame; and a light seal coupled to the frame and comprising: a body; flexible joints; a flange coupled to the body by the flexible joints, the flange forming a forehead portion extending between two of the flexible joints and side portions each extending away from a corresponding one of the flexible joints, the forehead portion and the side portions being configured to pivot relative to each other to change a curvature on an inner side of the flange.

One or more of the above clauses can include one or more of the features described below. It is noted that any of the following clauses may be combined in any combination with each other, and placed into a respective independent clause, e.g., clause A, B, or C.

Clause 1: a camera configured to capture a view, wherein the display is configured to display the view; a sensor; a microphone; and a speaker.

Clause 2: the inner cover is more opaque than the outer cover.

Clause 3: the inner cover and the outer cover are formed from breathable mesh.

Clause 4: the body surrounds a viewing chamber providing a view to the display, wherein the body forms channels extending from the outer surface of the body to the viewing chamber.

Clause 5: the body forms an inner surface to define a viewing chamber; and an inner cover further extends against the inner surface of the body.

Clause 6: the light seal further comprises a flange configured to extend from the body and pivot about a joint and with respect to the body to conform to a face of a user.

Clause 7: a head engager configured to pull the light seal toward a face of a user when worn.

Clause 8: the frame comprises a frame engager on an inner side of the frame; and the light seal further comprises a light seal engager on an outer side of the light seal, the light seal engager being configured to releasably engage the frame engager.

Clause 9: the body forms a bridge connector extending from an outer edge of the body to an outer edge of the flange.

Clause 10: the portion of the flange is a first portion; and the bridge connector maintains a second portion of the flange in a fixed position as the first portion pivots at the first section.

Clause 11: the portion of the flange is a forehead portion; the flange further comprises a side portion and a cheek portion; the first section of the body is one of multiple first sections; one of the first sections is connected to the flange between the forehead portion and the side portion; and one of the first sections is connected to the flange between the side portion and the cheek portion.

Clause 12: the flange is configured to transition between: a first configuration with the forehead portion moving toward the body and the side portions moving away from the body; and a second configuration with the forehead portion moving away from the body and the side portions moving toward the body.

Clause 13: the flexible joints comprise an elastic material that is more flexible than a material of the body.

As described above, one aspect of the present technology may include the gathering and use of data. The present disclosure contemplates that in some instances, this gathered data may include personal information or other data that uniquely identifies or can be used to locate or contact a specific person. The present disclosure contemplates that the entities responsible for the collection, disclosure, analysis, storage, transfer, or other use of such personal information or other data will comply with well-established privacy policies and/or privacy practices. The present disclosure also contemplates embodiments in which users can selectively block the use of or access to personal information or other data (e.g., managed to minimize risks of unintentional or unauthorized access or use).

A reference to an element in the singular is not intended to mean one and only one unless specifically so stated, but rather one or more. For example, "a" module may refer to one or more modules. An element proceeded by "a," "an," "the," or "said" does not, without further constraints, preclude the existence of additional same elements.

Headings and subheadings, if any, are used for convenience only and do not limit the invention. The word exemplary is used to mean serving as an example or illustration. To the extent that the term include, have, or the like is used, such term is intended to be inclusive in a manner similar to the term comprise as comprise is interpreted when employed as a transitional word in a claim. Relational terms such as first and second and the like may be used to distinguish one entity or action from another without necessarily requiring or implying any actual such relationship or order between such entities or actions.

Phrases such as an aspect, the aspect, another aspect, some aspects, one or more aspects, an implementation, the implementation, another implementation, some implementations, one or more implementations, an embodiment, the embodiment, another embodiment, some embodiments, one or more embodiments, a configuration, the configuration, another configuration, some configurations, one or more configurations, the subject technology, the disclosure, the present disclosure, other variations thereof and alike are for convenience and do not imply that a disclosure relating to such phrase(s) is essential to the subject technology or that such disclosure applies to all configurations of the subject technology. A disclosure relating to such phrase(s) may apply to all configurations, or one or more configurations. A disclosure relating to such phrase(s) may provide one or more examples. A phrase such as an aspect or some aspects may refer to one or more aspects and vice versa, and this applies similarly to other foregoing phrases.

A phrase "at least one of" preceding a series of items, with the terms "and" or "or" to separate any of the items, modifies the list as a whole, rather than each member of the list. The phrase "at least one of" does not require selection of at least one item; rather, the phrase allows a meaning that includes at least one of any one of the items, and/or at least one of any combination of the items, and/or at least one of each of the items. By way of example, each of the phrases "at least one of A, B, and C" or "at least one of A, B, or C" refers to only A, only B, or only C; any combination of A, B, and C; and/or at least one of each of A, B, and C.

It is understood that the specific order or hierarchy of steps, operations, or processes disclosed is an illustration of exemplary approaches. Unless explicitly stated otherwise, it is understood that the specific order or hierarchy of steps, operations, or processes may be performed in different order. Some of the steps, operations, or processes may be performed simultaneously. The accompanying method claims, if any, present elements of the various steps, operations or processes in a sample order, and are not meant to be limited to the specific order or hierarchy presented. These may be performed in serial, linearly, in parallel or in different order. It should be understood that the described instructions, operations, and systems can generally be integrated together in a single software/hardware product or packaged into multiple software/hardware products.

In one aspect, a term coupled or the like may refer to being directly coupled. In another aspect, a term coupled or the like may refer to being indirectly coupled.

Terms such as top, bottom, front, rear, side, horizontal, vertical, and the like refer to an arbitrary frame of reference, rather than to the ordinary gravitational frame of reference. Thus, such a term may extend upwardly, downwardly, diagonally, or horizontally in a gravitational frame of reference.

The disclosure is provided to enable any person skilled in the art to practice the various aspects described herein. In some instances, well-known structures and components are shown in block diagram form in order to avoid obscuring the concepts of the subject technology. The disclosure provides various examples of the subject technology, and the subject technology is not limited to these examples. Various modifications to these aspects will be readily apparent to those skilled in the art, and the principles described herein may be applied to other aspects.

All structural and functional equivalents to the elements of the various aspects described throughout the disclosure that are known or later come to be known to those of ordinary skill in the art are expressly incorporated herein by reference and are intended to be encompassed by the claims. Moreover, nothing disclosed herein is intended to be dedicated to the public regardless of whether such disclosure is explicitly recited in the claims. No claim element is to be construed under the provisions of 35 U.S.C. § 112, sixth paragraph, unless the element is expressly recited using the phrase "means for" or, in the case of a method claim, the element is recited using the phrase "step for".

The title, background, brief description of the drawings, abstract, and drawings are hereby incorporated into the disclosure and are provided as illustrative examples of the disclosure, not as restrictive descriptions. It is submitted with the understanding that they will not be used to limit the scope or meaning of the claims. In addition, in the detailed description, it can be seen that the description provides illustrative examples and the various features are grouped together in various implementations for the purpose of streamlining the disclosure. The method of disclosure is not to be interpreted as reflecting an intention that the claimed subject matter requires more features than are expressly recited in each claim. Rather, as the claims reflect, inventive subject matter lies in less than all features of a single disclosed configuration or operation. The claims are hereby incorporated into the detailed description, with each claim standing on its own as a separately claimed subject matter.

The claims are not intended to be limited to the aspects described herein, but are to be accorded the full scope consistent with the language of the claims and to encompass all legal equivalents. Notwithstanding, none of the claims are intended to embrace subject matter that fails to satisfy the requirements of the applicable patent law, nor should they be interpreted in such a way.

What is claimed is:

1. A head-mountable device comprising:
a frame;
a display supported by the frame; and
a light seal coupled to the frame and comprising:
    a body configured to releasably engage the frame, the body forming a concave shape on an outer surface of the body;
    an inner cover extending against the outer surface of the body; and an outer cover extending between protruding edges of the body to form a space enclosed between the inner cover and the outer cover.

2. The head-mountable device of claim 1, further comprising:
a camera configured to capture a view, wherein the display is configured to display the view;
a sensor;
a microphone; and
a speaker.

3. The head-mountable device of claim 1, wherein the inner cover is more opaque than the outer cover.

4. The head-mountable device of claim 1, wherein the inner cover and the outer cover are formed from breathable mesh.

5. The head-mountable device of claim 1, wherein the body surrounds a viewing chamber providing a view to the display, wherein the body forms channels extending from the outer surface of the body to the viewing chamber.

6. The head-mountable device of claim 1, wherein:
the body forms an inner surface to define a viewing chamber; and
the inner cover further extends against the inner surface of the body.

7. The head-mountable device of claim 1, wherein the light seal further comprises a flange configured to extend from the body and pivot about a joint and with respect to the body to conform to a face.

8. The head-mountable device of claim 1, further comprising a head engager configured to pull the light seal toward a face when worn.

9. The head-mountable device of claim 1, wherein:
the frame comprises a frame engager on an inner side of the frame; and
the light seal further comprises a light seal engager on an outer side of the light seal, the light seal engager being configured to releasably engage the frame engager.

10. The head-mountable device of claim 1, further comprising a head engager, wherein the body has, in a first section, a first thickness and, in a second section, a second thickness greater than the first thickness, and wherein the light seal further comprises a flange extending from the body, a portion of the flange being configured to pivot at the first section of the body when the head engager pulls the light seal against a face of a user.

11. A head-mountable device comprising:

a frame; and a light seal coupled to the frame and comprising:

a body configured to releasably engage the frame, the body forming a concave shape on an outer surface of the body, the body having, in a first section, a first thickness and, in a second section, a second thickness greater than the first thickness;

a flange extending from the body, a portion of the flange being configured to pivot at the first section of the body;

an inner cover extending against the outer surface of the body; and an outer cover extending from the flange to form a space enclosed between the inner cover and the outer cover.

12. The head-mountable device of claim 11, wherein:

the body forms a bridge connector extending from an outer edge of the body to an outer edge of the flange;

the portion of the flange is a first portion; and the bridge connector maintains a second portion of the flange in a fixed position as the first portion pivots at the first section.

13. The head-mountable device of claim 11, wherein:

the portion of the flange is a forehead portion;

the flange further comprises a side portion and a cheek portion;

the first section of the body is one of multiple first sections;

one of the first sections is connected to the flange between the forehead portion and the side portion; and one of the first sections is connected to the flange between the side portion and the cheek portion.

14. The head-mountable device of claim 11, wherein the flange defines a nose portion extending from the body and defining a gap between opposing flexible portions.

15. The head-mountable device of claim 11, wherein:

the frame comprises a frame engager on an inner side of the frame; and the light seal further comprises a light seal engager on an outer side of the light seal, the light seal engager being configured to releasably engage the frame engager.

16. A head-mountable device comprising:

a frame; and a light seal coupled to the frame and comprising:

a body configured to releasably engage the frame, the body forming a concave shape on an outer surface of the body;

flexible joints;

a flange coupled to the body by the flexible joints, the flange forming a forehead portion extending between two of the flexible joints and side portions each extending away from a corresponding one of the flexible joints, the forehead portion and the side portions being configured to pivot relative to each other to change a curvature on an inner side of the flange;

an inner cover extending against the outer surface of the body; and an outer cover extending between protruding edges of the body to form a space enclosed between the inner cover and the outer cover.

17. The head-mountable device of claim 16, wherein the flange is configured to transition between:

a first configuration with the forehead portion moving toward the body and the side portions moving away from the body; and a second configuration with the forehead portion moving away from the body and the side portions moving toward the body.

18. The head-mountable device of claim 16, wherein the flexible joints comprise an elastic material that is more flexible than a material of the body.

19. The head-mountable device of claim 16, further comprising a head engager configured to pull the light seal toward a face when worn.

20. The head-mountable device of claim 16, wherein:

the frame comprises a frame engager on an inner side of the frame; and the light seal further comprises a light seal engager on an outer side of the light seal, the light seal engager being configured to releasably engage the frame engager.

* * * * *